United States Patent [19]

Ironside et al.

[11] Patent Number: 4,481,844
[45] Date of Patent: Nov. 13, 1984

[54] TRANSMISSION SYSTEM

[75] Inventors: John M. Ironside, Birmingham; Nigel A. Deller, Warwick; Clive R. Sainsbury, Birmingham; Paul Weston, Solihull, all of England

[73] Assignee: Lucas Industries Limited, Brimingham, England

[21] Appl. No.: 355,554

[22] PCT Filed: Jul. 10, 1981

[86] PCT No.: PCT/GB81/00135
§ 371 Date: Feb. 2, 1982
§ 102(e) Date: Feb. 2, 1982

[87] PCT Pub. No.: WO 82/00271
PCT Pub. Date: Feb. 4, 1982

[30] Foreign Application Priority Data

Jul. 10, 1980 [GB] United Kingdom ............. 8022569

[51] Int. Cl.³ .................. B60K 41/18; B60K 41/12
[52] U.S. Cl. ................................. 74/866; 74/859; 74/860; 74/862
[58] Field of Search ............ 74/866, 859, 860, 862, 74/865

[56] References Cited

U.S. PATENT DOCUMENTS

| 3,406,597 | 10/1968 | DeBrie Perry et al. | 74/865 |
| 3,548,682 | 10/1968 | Schofield et al. | 74/865 X |
| 4,082,013 | 4/1978 | Dornfeld et al. | 74/866 |
| 4,107,776 | 8/1978 | Beale | 74/866 X |
| 4,111,073 | 9/1978 | Chana | 74/865 |
| 4,131,035 | 12/1978 | Mizuno et al. | 74/866 |
| 4,200,007 | 4/1980 | Espenschied et al. | 74/859 |
| 4,281,567 | 8/1981 | Maurer | 74/866 |
| 4,381,684 | 5/1983 | Himmelstein | 74/862 |

FOREIGN PATENT DOCUMENTS

| 2811953 | 9/1979 | Fed. Rep. of Germany | 74/866 |
| 2318355 | 2/1977 | France | |
| 1078791 | 8/1967 | United Kingdom | |
| 1525861 | 9/1978 | United Kingdom | |
| 2030661 | 4/1980 | United Kingdom | 74/866 |

Primary Examiner—Allan D. Herrmann
Attorney, Agent, or Firm—Ladas & Parry

[57] ABSTRACT

A transmission system comprises an engine (10) which drives a propeller shaft (14) through continuously variable gearing (CVG) (11), split path gearing (12), and a disconnector device (13). The gear ratio of the CVG (11) is controlled by an actuator (24). The input and output shaft speeds of the CVG (11) are sensed by transducers (25, 26) and the propeller shaft speed is sensed by a pair of transducers (27, 28). The system is responsive to an accelerator pedal (22) and a selector switch (23), and controls a throttle (19) via an electric motor (20).

In normal operation, with the selector switch (23) in the drive position (D) or the reverse position (R), two signal generators (41, 42) calculate a target throttle position and a target engine speed and the motor (20) and actuator (24) adjust the throttle (19) and CVG (11) accordingly.

When the switch (23) is in the neutral position (N) or the park position (P), the disconnector device (13) receives the drive from the propeller shaft (14). The speed ($N_O'$) of the propeller shaft (14) corresponding to the prevailing setting of the CVG (14) is calculated by circuitry (30 to 34) responsive to transducers (25, 26). The calculated speed ($N_O'$) is compared with the actual propeller shaft speed ($N_O$) in a summing circuit (35), and the output of this circuit provides a control signal via a frequency compensation circuit (36) and an amplifier (49) to the actuator (24) so as to vary the ratio of the CVG (24) to the equalize the calculated speed ($N_O'$) with the actual speed ($N_O$).

8 Claims, 13 Drawing Figures

TRANSMISSION SYSTEM

TECHNICAL FIELD

This invention relates to a transmission system comprising a gear train which includes continuously variable gearing and split path gearing driven by the continuously variable gearing, and particularly relates to such a transmission system installed in a motor vehicle.

BACKGROUND ART

In each of United Kingdom Patent Specification Nos. 1078791 and 1525861, there is described a motor vehicle transmission system comprising continuously variable gearing driven by the vehicle engine, and split path gearing driven by the continuously variable gearing, the split path gearing having an output shaft which provides drive to the vehicle wheels. In order to positively disconnect the engine from the vehicle wheels, the split path gearing can include means for disconnecting the drive from its output shaft.

In such a transmission system, at a particular ratio setting of the continuously variable gearing, known as "geared neutral", there is no rotation of the output shaft of the split path gearing. An increase or a decrease of the ratio of the continuously variable gearing from geared neutral results in the vehicle being driven backwards or forwards. When a vehicle is stationary, the continuously variable gearings is set at geared neutral and this setting is then normally maintained. When it is desired to drive the vehicle, the ratio of the continuously variable gearing is displaced from this setting. Alternatively, when the vehicle is stationary, the means for disconnecting drive from the output shaft of the split path gearing may be operated in order to provide a positive disconnection between the engine and the wheels. This is usually achieved by putting the vehicle gear lever into the neutral or park position.

It has been found that when the disconnection means is operated, the ratio of the continuously variable gearing drifts away from the setting which corresponds to geared neutral. Consequently, when drive is subsequently restored to the output shaft of the split path gearing, a transient torque is experienced in the transmission system due to the inertia of the transmission parts and the limits on rapid ratio change imposed by constraints in the continuously variable gearing. Also, if a vehicle is permitted to move with the disconnection means operated, as may be the case where a vehicle is permitted to roll down hill, the ratio setting of the continuously variable gearing will not adjust to the change in the output shaft speed of the split path gearing and consequently the transient torque will be experienced when drive is restored to the output shaft. Such transient torques are unsatisfactory as they reduce the smoothness of the transmission system.

Accordingly, it is an object of this invention to provide a new or improved transmission system and also a method for controlling a transmission system in which the above mentioned disadvantage is overcome or reduced.

DISCLOSURE OF INVENTION

According to one aspect of this invention there is provided a transmission system comprising a gear train and means for controlling the gear train, said gear train comprising variable gearing having an input shaft, an output shaft, and an operating mechanism for controlling the gear ratio, and split path gearing driven by the continuously variable gearing having an output shaft and means for disconnecting drive from the output shaft, said control means including an actuator for driving the operating mechanism, transducer means mounted in the gear train, and means responsive to the transducer means for providing a control signal to the actuator, in use, when the drive is disconnected from the output shaft said signal generating means estimating the output speed of the split path gearing associated with prevailing setting of the continuously variable gearing, comparing the estimated output shaft speed with the actual output shaft speed of the split path gearing, and varying the control signal to the actuator so as to equalise the estimated shaft speed with the actual output shaft speed.

By equalising the estimated shaft speed with the output shaft speed, it is ensured that the ratio setting of the continuously variable gearing is maintained to the value appropriate to the speed of the output shaft when drive is disconnected therefrom, with the result that there are no transient torques when drive is restored to the output shaft.

According to another aspect of this invention there is provided a method of controlling a transmission system comprising continuously variable gearing having an input shaft, an output shaft, and an operating mechanism for controlling the gear ratio, split path gearing driven by the continuously variable gearing having an output shaft and means for disconnecting drive from the output shaft, and an actuator for driving the operating mechanism, the method including, when drive is disconnected from the output shaft of the split path gearing, estimating the speed of the output shaft of the split path gearing associated with the prevailing setting of the continuously variable gearing, comparing the estimated output shaft speed with the actual output shaft speed, and providing a control signal to the actuator so as to equalise the estimated output shaft speed with the actual output shaft speed.

BEST METHOD OF CARRYING OUT THE INVENTION

Figure 1:
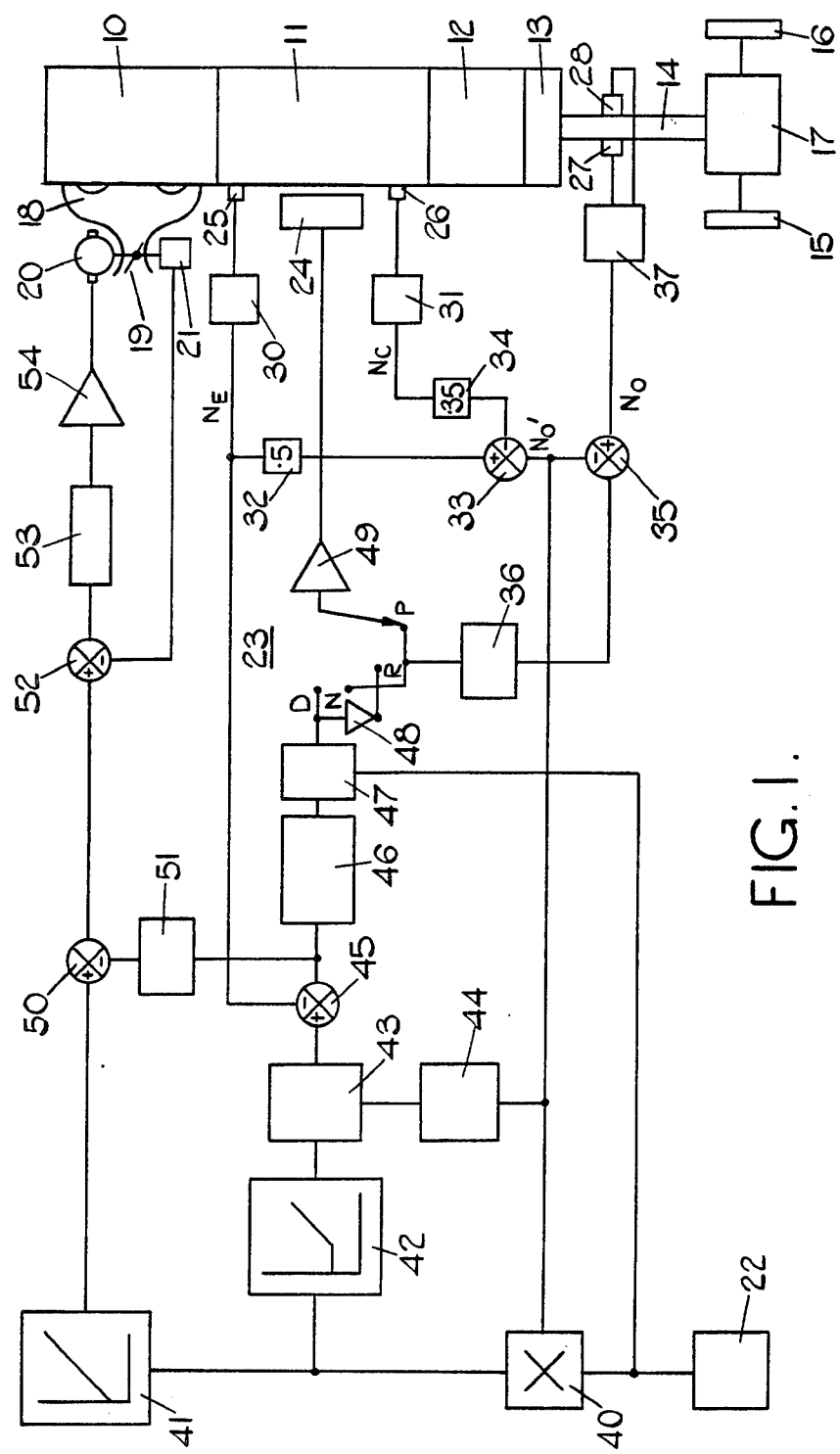
FIG. 1 is a block diagram of a motor vehicle transmission system embodying this invention.

Referring now to FIG. 1, there is shown a transmission system which comprises an internal combustion engine 10, and a gear train consisting of continuously variable gearing 11 driven by the engine 10 and split path gearing 12 driven by the continuously variable gearing 11. The split path gearing 12 includes a device 13 for positively disconnecting drive from its output shaft and the output shaft of the split path gearing 12 is connected to a vehicle propeller shaft 14 which drives the vehicle wheels 15 and 16 through a differential gear 17.

The engine 10 includes an inlet manifold 18 in which is mounted a throttle member 19 driven by an electric motor 20. The position of the throttle member 19 is detected by a position transducer 21.

The transmission system also includes driver operated controls in the form of an accelerator pedal 22 and a selector lever, not shown. The selector lever has four positions, namely a drive position D, a neutral position N, a reverse position R and a park position P. The selector lever is ganged to a four-way switch 23, the four terminals of this switch corresponding to the positions D, N, R and P being labelled accordingly. As will be described in more detail below, the continuously variable gearing 11, which is of the Perbury type, has a reaction lever and this is controlled by an actuator 24. The continuously variable gearing 11 is provided with a pair of transducers 25 and 26 for detecting the rotational speeds of its input and output shafts. The transducers 25 and 26, which may be of magnetic or optical type, provide pulse trains the frequency of which is proportional to the speed of rotation of the associated shaft. The propeller shaft 14 is provided with a pair of transducers 27 and 28 for detecting its speed of rotation. As will be explained in more detail hereinafter, the pick-ups 27 and 28 each provide pulse trains at a frequency proportional to the speed of rotation of the propeller shaft 14, these two pulse trains being in quadrature to each other.

The transducer 25 is connected to a frequency to voltage converter 30, at the output of which there is provided a signal $N_E$ the value of which is proportional to the speed of rotation of the input shaft of the continuously variable gearing 11. The transducer 26 is connected to the input of a frequency to voltage converter 31, at the output of which there is provided a signal $N_C$, the value of which is proportional to the speed of rotation of the output of continuously variable gearing 11. The signal $N_E$ is supplied to a circuit 32 in which it is multiplied by 0.5, the output of the circuit 32 being supplied to the positive input of a summing circuit 33, and the signal $N_O$ is supplied to the input of a circuit 34 in which it is multiplied by a value 0.35, the output of the circuit 34 being supplied to the negative input of the summing circuit 33. At the output of summing circuit 33, there is provided a signal $N_O'$, this signal representing an estimated speed of rotation of the propeller shaft 14 associated with the prevailing ratio of the continuously variable gearing 11. The outputs of transducers 27 and 28 are connected to the input of the frequency to voltage converter 37, at the output of which is provided a signal $N_O$ representative of the propeller shaft speed. The signals $N_O$ and $N_O'$ are supplied respectively to the positive and negative inputs of a summing circuit 35, at the output of which there is provided a signal proportional to the difference between the signals $N_O$ and $N_O'$. The output of the summing circuit 35 is supplied to the input of a frequency compensation circuit 36, the output of which is connected to the N and P terminals of selector switch 23.

The pedal 22 provides a signal proportional to the depression thereof and this signal is supplied to one input of a multiplier circuit 40, the other input of which receives the signal $N_O'$. At the output of the multiplier circuit 40, there is provided a signal which represents the power demanded by the driver of the vehicle. This signal is supplied to the inputs of a pair of function generators 41, and 42. For each value of the power demanded by the driver, the present system calculates a target engine speed and a target position of the throttle 19, the target engine speed and the target position of the throttle 19 being calculated respectively in the signal generators 42 and 41. The target engine speed and the target throttle setting are those at which it is considered that the demanded power may be most efficiently produced by the engine 10.

The output of the signal generator 42 is supplied to the input of a highest wins circuit 43. The signal $N_O'$ is supplied to the input of a circuit 44, at the output of which there is provided a signal representative of the minimum engine speed for the prevailing value of the speed of the propeller shaft 14. As will be explained hereinafter, the minimum engine speed for the prevailing speed of the propeller shaft 14 is calculated so as to avoid driving the continuously variable gearing 11 outside its operating range. The ouput of the circuit 44 is supplied to a second input of the highest wins circuit 43.

The output of the circuit 43 is supplied to one input of a summing circuit 45, the negative input of which receives the signal $N_E$. The output of the summing circuit 45 is an error signal which represents the difference between the target engine speed and the actual engine speed and this signal is supplied to the input of an inverting frequency compensation circuit 46. The output of the frequency compensation circuit 46 is supplied to one input of a lowest wins circuit 47, the other input of which receives the signal generated by the pedal 22. As will be explained in more detail hereinafter, at low speeds of the propeller shaft 14, the target engine speed cannot be achieved and so the continuously variable gearing 11 is controlled by the position of the pedal 22.

The output of the lowest wins circuit 47 is connected directly to the terminal D of switch 23 and through an inverter 48 to the terminal R. The output of switch 23 is connected to the input of a power amplifier 49, the output of which provides a control signal to the actuator 24.

The output of the signal generator 41 is provided to the positive input of a summing circuit 50. As will be explained in more detail hereinafter, at low speeds of the propeller shaft 14 in order to reduce the setting of throttle 19 below the target value, the output of summing circuit 45 is supplied to the input of a frequency compensation circuit 51, the output of which is supplied to the negative input of the summing circuit 50. At the output of summing circuit 50, there is supplied a signal which represents the demanded position of the throttle 19 and this signal is supplied to the positive input of a summing circuit 52. The output of the position transducer 21 is supplied to the negative input of the summing circuit 52. At the output of the summing circuit 52, there is provided a signal which represents the difference between the demanded position of throttle 19 and its actual position and this signal is supplied through a frequency compensation circuit 53 to the input of a power amplifier 54. The output of the power amplifier 54 provides the drive signal for the motor 20.

The various parts of the transmission system will now be described in greater detail.

Figure 2A:
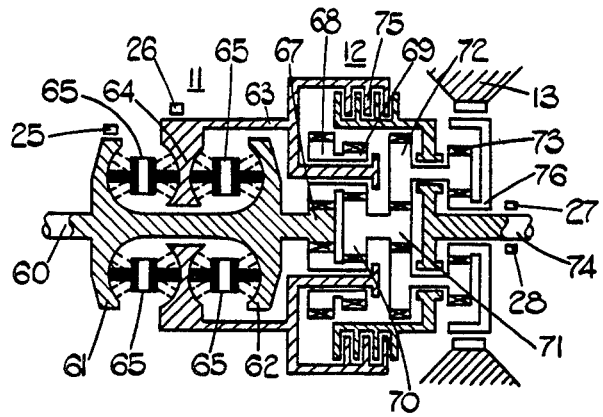
FIGS. 2a to 2d are cross sectional drawings of the continuously variable gearing forming part of the transmission system shown in FIG. 1, and FIGS. 3 to 9 are circuit diagrams of parts of the transmission system shown in FIG. 1.

Referring now to FIG. 2a, there is shown the continuously variable gearing 11 and the split path gearing 12. The continuously variable gearing 11 is of the Perbury type and comprises an input shaft 60 connected to a pair of input discs 61 and 62, and an output shaft 63 which is connected to an output disc 64. The input disc 61 and 62 and the output disc 64 are provided with toroidal surfaces and drive is transmitted from the input discs 61 and 62 to the output disc 64 by a set of roller members 65. The roller members 65 are mounted so that their axes of rotation can move angularly, angular movement of these axes varying the ratio of the Perbury gearing 11. The angular position of the roller member 65 is controlled by a reaction lever not shown, the reaction lever being driven by the actuator 24. It is a characteristic of the Perbury gearing 11 that a fixed porportion of the sum of the input and output torques are transmitted to the casing by the reaction lever. In operation, if there is an imbalance between the torque supplied to the reaction lever by the actuator 24 and the input and output torques, the axes of rotation of the roller 54 will quickly rotate so as to vary the ratio of the gearing in a manner which removes this imbalance.

The input shaft 60 of the Perbury gearing 11 is connected to an input sun gear 67 of a first epicyclic gear train. This first epicyclic gear train includes planetary gears 68 and 69 mounted on a common carrier driven by the output shaft 63. The planetary gears 68 mesh with the input sun gear 63 and the planetary gears 69 mesh with an output sun gear 70 of this first epicyclic gear train. The output sun gear 70 is connected to an input sun gear 71 of a second epicyclic gear train. The second epicyclic gear train includes planetary gears 72 and 73 mounted on a carrier which is connected to the output shaft of the split path gearing 12 and also through a clutch 75 to the output shaft 63 of Perbury gearing 11. The planetary gears 72 mesh with the sun gear 71 and the planetary gears 73 mesh with a ring gear 76 which may be engaged by the disconnection device in the form of a brake 13.

When the clutch 75 and the brake 13 are both in the disengaged state, as shown in FIG. 2a, no drive is transmitted to the shaft 74 and thus the propeller shaft 14 is positively disconnected from the engine 10.

Figure 2B:
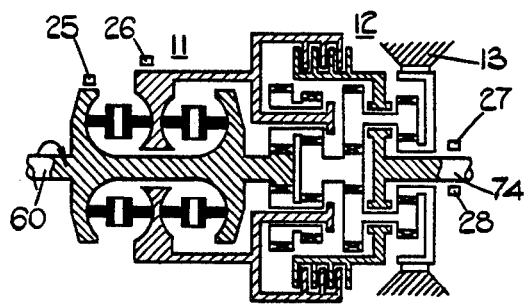
Figure 2C:
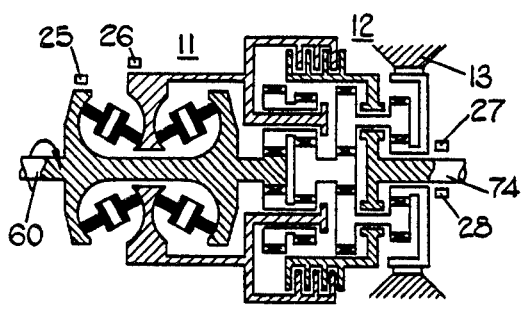
Figure 2D:
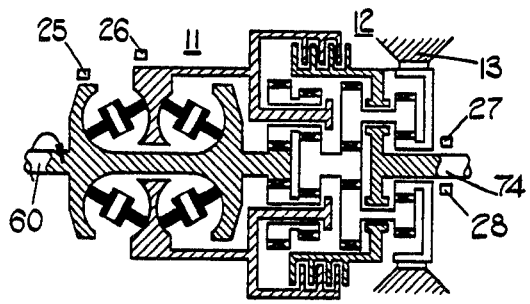

Drive may be transmitted from the input shaft 60 to the output shaft 74 in two modes, and in the first of these modes as shown in FIGS. 2b to 2d the brake 13 engages the ring gear 76. In this mode of operation, some of the input power from the engine is recirculated through the Perbury gearing 11 before being transmitted to the output shaft 74. In FIG. 2b, there is shown the position of the roller members 65 which corresponds to geared neutral in which the output shaft 74 does not rotate. As shown in FIGS. 2c and 2d respectively, displacement of the roller members 65 in directions which increase and decrease the gear ratio of the Perbury gearing 11 results in reverse and forward drive being transmitted to the output shaft 74.

In the second mode of operation of the split path gearing 12, the brake 13 is released and the clutch 75 is engaged with the result that the output shaft 63 is coupled directly to the output shaft 74. The second mode of operation provides the higher overall ratios of the gearing 11 and 12. The change over from the first mode of operation to the second mode of operation and the control of the transmission system in the second mode form no part of the present invention and will not be described in further detail hereinafter.

When the gearing is in the first mode of operation, the speed of rotation $N_O$ of the output shaft 74 is related, in general, to the speed of rotation of $N_E$ of the input shaft 60 and the speed of rotation of $N_C$ of the output shaft 63 by the following equation:

$$N_O = K_1 N_E - K_2 N_C$$

where $K_1$ and $K_2$ are constants. Values for $K_1$ and $K_2$ may be obtained from the geometry of the gear teeth. Alternatively, $K_1$ and $K_2$ may be obtained by setting $N_O$ and $N_E$ to known speeds and measuring $N_C$ and thereby obtaining one equation for $K_1$ and $K_2$. $N_O$ and $N_E$ are then set to new value and $N_C$ is then measured to obtain a second equation for $K_1$ and $K_2$. $K_1$ and $K_2$ are then obtained by solving the resulting simultaneous equation. In the present example $K_1 = 0.5$ and $K_2 = 0.35$ thereby giving the following equation:

$$N_O = 0.5 N_E - 0.35 N_C$$

As may be appreciated, the circuits 32, 33 and 34 shown in FIG. 1 calculate the signal $N_O'$ using the equation.

Figure 3:
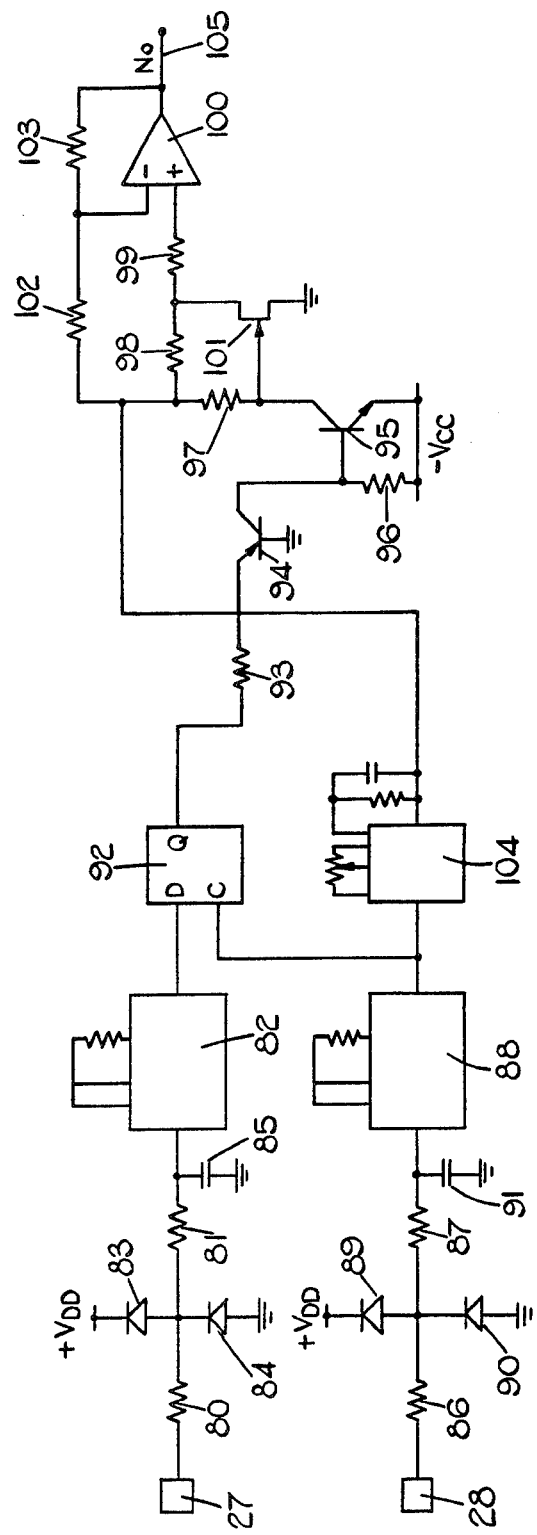
Figure 3A:

Referring now to FIG. 3, there is shown the detailed circuit diagram for the transducers 27 and 28 and the frequency-voltage converter 37. Each of the transducers 27, 28 may be type 70D1102/70DA15 made by Orbit Controls Limited. The transducers 27, 28 are associated with a toothed wheel mounted on the propeller shaft 14 and they are displaced around the circumference of this toothed wheel by $(4N+1).L/4$, where N is an integer and L is the cyclic pitch of the teeth. Examples of pulse trains produced by these transducers are shown in FIG. 3a, in which the left hand side shows the pulse trains for forward motion of the propeller shaft 14, the centre part shows the signals when the propeller shaft is stationary, and the right hand side shows the pulse trains for reverse rotation. As may be seen, the output signals of the transducers 27, 28 have a quadrature relationship to each other. The output of transducer 27 is connected through a resistor 80 and a resistor 81 to the input of a Schmitt trigger 82. In order to provide protection and noise filtering, the junction of resistors 80 and 81 is connected to the anode of a diode 83, the cathode of which is connected to a positive supply rail, and also to the cathode of a diode 84, the anode of which is connected to earth, and the input of Schmitt trigger 82 is also connected to earth through a capacitor 85. Likewise, the output of transducer 28 is connected through a pair of resistors 86 and 87 to the input of another Schmitt trigger 88. The junction of resistors 86 and 87 is connected to the anode of a diode 89, the cathode of which is connected to a positive supply rail, and also to the cathode of a diode 90, the anode of which is connected to earth. The input of Schmitt trigger 88 is connected to earth through a capacitor 91. Each of the Schmitt triggers 82 and 88 comprises one half of a Motorola type MC14583 Schmitt trigger. The output of Schmitt trigger 82 is connected to the D input of flip-flop 92. The flip-flop 92 comprises one half of a Motorola type MC14013 D-type flip-flop. The output of Schmitt trigger 88 is connected to the C input of flip-flop 92. Consequently, for forward rotation of the propeller shaft 14, the Q output of flip-flop 92 goes high and for reverse rotation it goes low. The Q output of flip-flop 92 is connected through a resistor 93 to the emitter of a PNP transistor 94, the base of which is connected to earth and the collector of which is connected to the base of an NPN transistor 95 and through a resistor 96 to a negative supply rail. The emitter of transistor 95 is connected to the negative supply rail and its collector is connected through a 15 kΩ resistor 97, a 10 kΩ resistor 98, a 10 kΩ resistor 99, to the non-inverting input of an operational amplifier 100. The junction of resistors 98 and 99 is connected to the first base of an N channel JFET transistor 101, the gate of which is connected to the collector of transistor 95 and the second base of which is connected to earth. The junction of resistors 97 and 98 is connected through a 2 kΩ resistor 102 to the inverting input of amplifier 100, and the output of amplifier 100 is connected to its non-inverting input through a 20 kΩ resistor 103. The output of Schmitt trigger 88 is connected to the input of a frequency to voltage converter 104 which in the present example is an Ancom type 15 FV3 frequency to voltage converter. At the output of converter 104, there is provided a signal the magnitude of which corresponds to the rotational speed of the propeller shaft and this signal is supplied to the junction of resistors 98 and 97. For reverse rotation of the propeller shaft, this signal is inverted by amplifier 100 and for forward rotation the signal is supplied at the output of amplifier 100 with unity gain. Consequently, at the output of amplifier 100 on rail 105 there is provided a signal $N_O$, the magnitude and polarity of which corresponds to the rotational speed of the propeller shaft.

The transducers 25 and 26 are associated with toothed wheels mounted on the input and output shafts 61 and 62 of Perbury gearing 11. Each of the circuits 30 and 31 simply comprises a filtering and noise protection circuit, a Schmitt trigger, and a frequency to voltage converter as shown at 86 to 91 and 104 for transducer 28. As the shafts 61 and 62 rotate in only one direction, there is no need to provide polarity correction.

Figure 4:
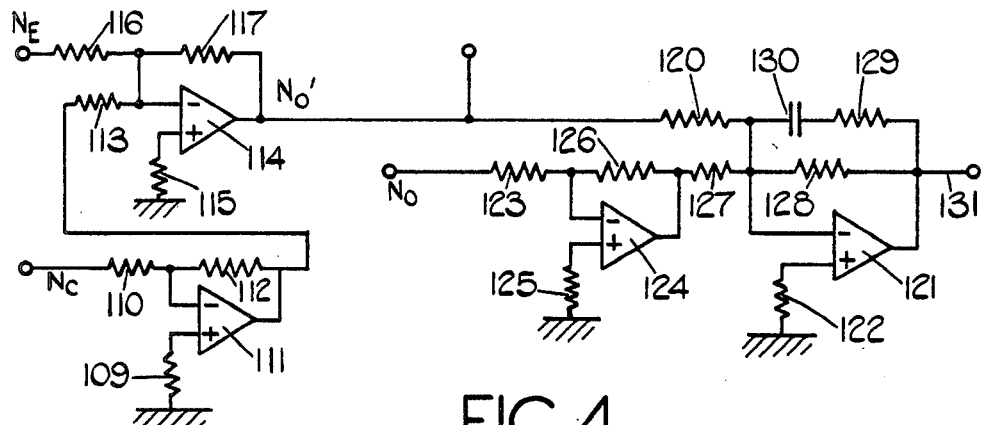

Referring now to FIG. 4, there is shown the detail circuit diagram for circuits 32 and 34, the summing circuits 33 and 35 and the frequency compensation circuit 36. The signal $N_C$ is supplied through a 20 kΩ resistor 110 to the inverting input of an operational amplifier 111, the non-inverting input of which is connected through a resistor 109 to earth and the output of which is connected through a 10 kΩ resistor 112 to its inverting input. The output of amplifier 111 is also connected through a 5.6 kΩ resistor 113 to the inverting input of an operational amplifier 114, the non-inverting input of which is connected through a resistor 115 to earth. The signal $N_E$ is supplied through a 16 kΩ resistor 116 to the inverting input of amplifier 114 and the output of amplifier 114 is connected through a 5.6 kΩ resistor 117 to its inverting input. At the output of amplifier 114 there is provided the signal $N_O'$ which represents an estimate of the speed of rotation of the output shaft 14 associated with the prevailing setting of the reaction lever of the Perbury gearing 11.

The signal $N_O'$ is supplied through a 10 KΩ resistor 120 to the inverting input of an operational amplifier 121, the non-inverting input of which is connected through a resistor 122 to earth. The signal $N_O$ is supplied through a 10 kΩ resistor 123 to the inverting input of an operational amplifier 124, the non-inverting input of which is connected to earth through a resistor 125 and the output of which is connected to a 10 kΩ resistor 126 to its inverting input. Thus, the amplifier 124 simply inverts the signal $N_O$ and the output of this amplifier is connected through a 10 kΩ resistor 127 to the inverting input of amplifier 121. The output of amplifier 121 is connected to its inverting input through a 10 kΩ resistor 128, and also through a resistor 129 and a capacitor 30 connected in series with each other and in parallel with resistor 128. Thus, the amplifier 121 corresponds to both the summing circuit 35 and the frequency compensation circuit 36 shown in FIG. 1, the output of the amplifier 121 on rail 131 corresponding to the output of the frequency compensation circuit 36.

Figure 5:
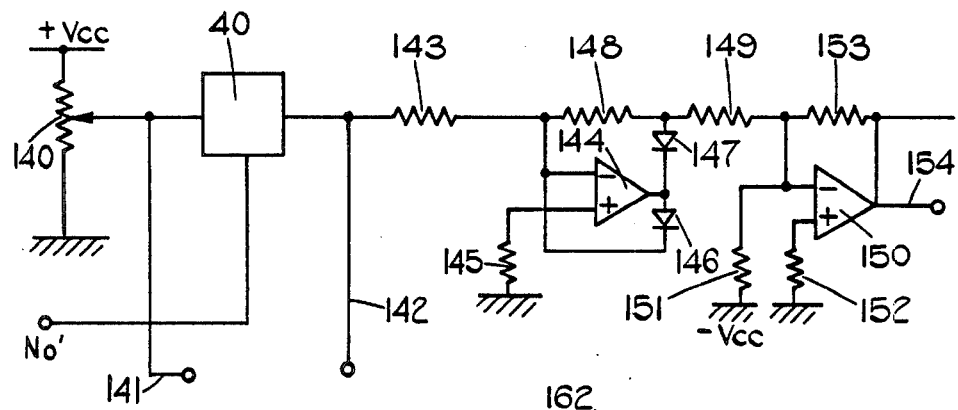

Referring now to FIG. 5, there is shown the circuit diagram for the pedal 22, multiplier 40 and signal generator 41. The pedal 22 operates the slider of a potentiometer 140 which is connected between the positive supply rail and earth. The sliding contact of potentiometer 140 is connected to a rail 141, the signal on this rail corresponding to the depression of pedal 22. The rail 141 is connected to one input of multiplier 40, the other input of which receives as mentioned above the signal $N_O'$. The output of multiplier 40 is supplied to a rail 142 and as mentioned above the signal on this rail corresponds to the power demanded by the driver. The rail 142 is connected through a resistor 143 to the inverting input of an operational amplifier 144, the non-inverting input of which is connected through a resistor 145 to earth. The output of amplifier 144 is connected to the anode of a diode 146, the cathode of which is connected to the inverting input of amplifier 144, and also to the cathode of a diode 147, the anode of which is connected through a resistor 148 to the inverting input. The anode of diode 147 is also connected through a resistor 149 to the inverting input of an operational amplifier 150, the inverting input of which is connected to a negative supply rail through a resistor 151 and the non-inverting input of which is connected to earth through a resistor 152. The output of amplifier 150 is also connected to its inverting input through a resistor 153. The output of amplifier 150 is supplied to a rail 154, the signal on this rail corresponding to the output of the function generator 41 shown in FIG. 1. As mentioned above, this signal represents the throttle target position.

Figure 6:
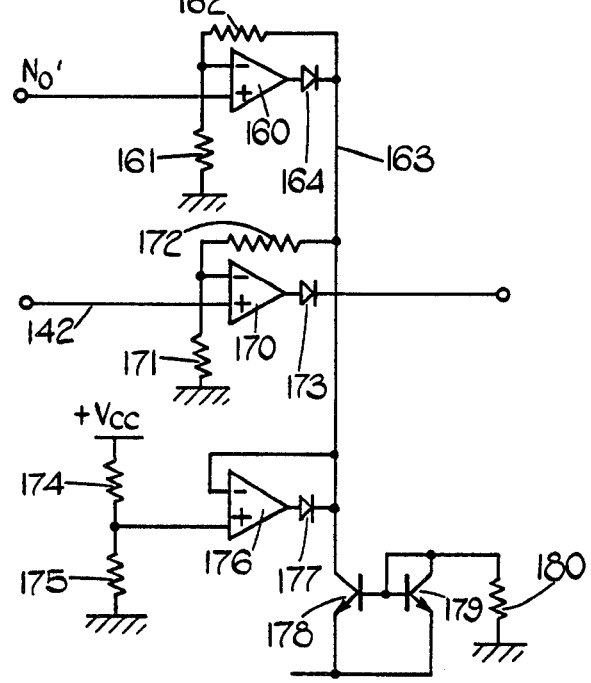

Referring now to FIG. 6, there is shown the circuit diagram for the function generator 42, the highest wins circuit 43 and the circuit 44. The signal $N_O'$ is supplied to the non-inverting input of an operational amplifier 160, the inverting input of which is connected to earth through a resistor 161 and through a resistor 162 to a rail 163. The output of amplifier 160 is connected to the anode of a diode 164 the cathode of which is connected to rail 163. The rail 142 is connected to the non-inverting input of an amplifier 170, the inverting input of which is connected to earth through a resistor 171 and to rail 163 through a resistor 172. The output of amplifier 170 is connected to the anode of a diode 173, the cathode of which is connected to rail 163. A pair of resistors 174 and 175 are connected in series between a positive supply rail and earth and the junction of these resistors is connected to the non-inverting input of an operational amplifier 176. The output of amplifier 176 is connected to the anode of a diode 177, the cathode of which is connected to the rail 163 and the rail 163 is connected directly to its inverting input. The rail 163 is also connected to a constant current sink which comprises a pair of NPN transistors 178 and 179. The collector of transistor 178 is connected to the rail 163 and its emitter is connected to a negative supply rail, the collector of transistor 179 is connected to the commonly connected bases of transistors 178 and 179 and also to earth through resistor 180 and the emitter of transistor 179 is connected to the negative supply rail. The output of amplifier 170 corresponds to the output of the function generator 42 shown in FIG. 1 and corresponds to the target engine speed. The output signal of 160 corresponds to the output of circuit 44 shown in FIG. 1. The highest of these two signals is supplied to the rail 163 which corresponds to the output of the highest wins circuit 43.

Figure 7:
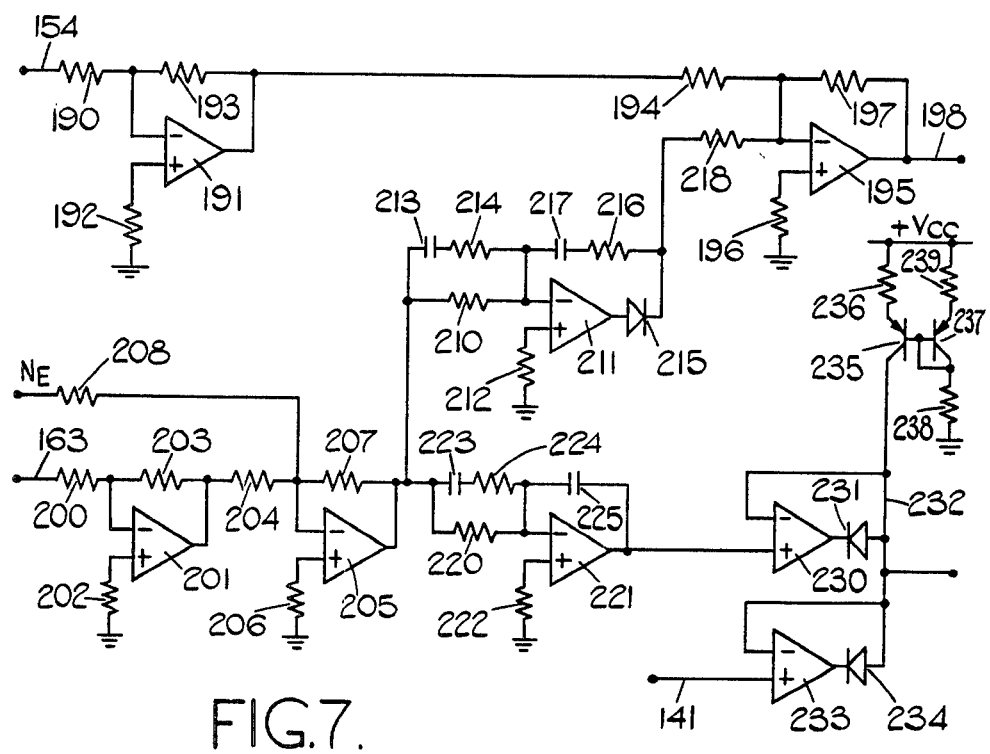

Turning now to FIG. 7, there is shown the detailed circuit diagram for the summing circuit 50, the frequency compensation circuit 51, the summing circuit 45, the inverting frequency compensation circuit 46, and the lowest wins circuit 47. Rail 154 which carries a signal representing target throttle position is connected through a 10 kΩ resistor 190 to the inverting input of an operational amplifier 191, the non-inverting input of which is connected to earth through a resistor 192. The output of amplifier 191 is connected through a 10 kΩ resistor 193 to its inverting input and thus this amplifier inverts the signal on rail 154. The output of amplifier 191 is connected through a 10 kΩ resistor 194 to the inverting input of an operational amplifier 195, the non-inverting input of which is connected to earth through a resistor 196 and the output of which is connected through a 10 kΩ resistor 197 to its inverting input. The output of amplifier 195 is supplied to a rail 198 and the signal on this rail corresponds to the output signal of the summing circuit 50 shown in FIG. 1.

The signal on rail 163 corresponds to the output of the highest wins circuit 43 is supplied through a 10 kΩ resistor 200 to the inverting input of an operational amplifier 201, the non-inverting input of which is connected to earth through a resistor 202 and the output of which is connected through a 10 kΩ resistor 203 to its inverting input. Thus, amplifier 201 inverts the signal on rail 163. The output of amplifier 201 is connected through a 10 kΩ resistor 204 to the inverting input of an operational amplifier 205, the non-inverting input of which is connected through a resistor 206 to earth. The output of amplifier 205 is connected to its inverting input through a 10 kΩ resistor 207. The signal $N_E$ is supplied through a 10 kΩ resistor 208 to the inverting input of amplifier 205. Thus, the output signal of amplifier 205 corresponds to the output of summing circuit 45 and represents the error between the demanded engine speed and the actual engine speed.

The output of amplifier 205 is connected through a resistor 210 to the inverting input of an operational amplifier 211, the non-inverting input of which is connected to earth through a resistor 212. The output of amplifier 205 is also connected through a capacitor 213 and a resistor 214 connected in series to the inverting input of amplifier 211. The output of amplifier 211 is connected to the anode of a diode 215, the cathode of which is connected through a resistor 216 and a capacitor 217, connected in series, to its inverting input. The amplifier 211 and its associated components correspond to the frequency compensation circuit 51 and the cathode of diode 215 is connected through a 10 kΩ resistor 218 to the inverting input of amplifier 195.

The output of amplifier 205 is also connected through a resistor 220 to the inverting input of an operational amplifier 221, the non-inverting input of which is connected through a resistor 222 to earth. The output of amplifier 205 is also connected through a capacitor 223 and a resistor 224 connected in series to the inverting input of amplifier 221 and the output of amplifier 221 is connected to its inverting input through a capacitor 225. The amplifier 221 and its associated components correspond to the inverting frequency compensation circuit 46.

The output of amplifier 221 is connected to the non-inverting input of an operational amplifier 230, the output of which is connected to the cathode of a diode 231, and the anode of diode 231 is connected to a rail 232. The rail 232 is connected directly to the inverting input of amplifier 230. The signal on rail 141 which corresponds to the depression of the pedal 22 is supplied to the non-inverting input of an operational amplifier 233 the output of which is connected to the cathode of a diode 234, and the anode of diode 234 is connected to rail 232. Rail 232 is connected directly to the inverting input of amplifier 233. The rail 232 is connected to the collector of a PNP transistor 236, the emitter of which is connected through a resistor 236 to a positive supply rail and the base of which is connected to the base of a PNP transistor 237. The collector of transistor 237 is connected to its base and also through a resistor 238 to earth, and its emitter is connected to the positive supply rail through a resistor 239. Transistors 235 and 237 function as a constant current source. The amplifiers 230 and 233 and associated components correspond to the lowest wins circuit 47, the signal on rail 232 corresponding to the output of this circuit.

Figure 8:
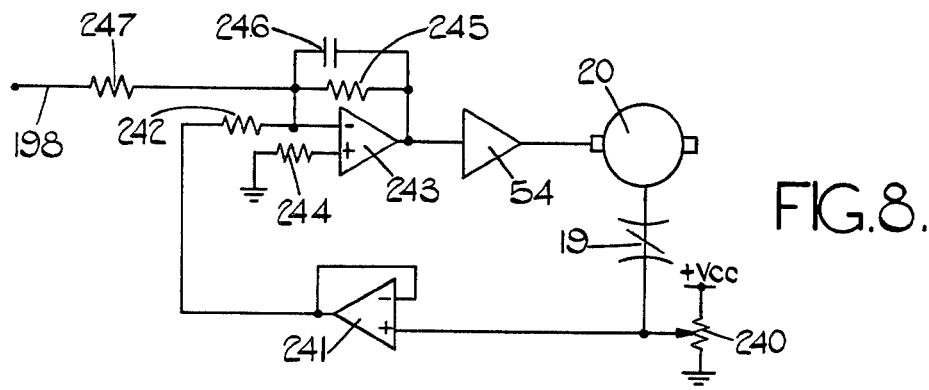

The detailed circuit diagram for the summing circuit 52, frequency compensating circuit 53, power amplifier 54, motor 20, and transducer 21 is shown in FIG. 8. The transducer 21 takes the form of a potentiometer 240 connected between a positive supply rail and earth, the slider of the potentiometer being driven by the throttle 19. The slider of the potentiometer 240 is connected to the non-inverting input of an operational amplifier 241, the output of which is connected to its inverting input so as to provide a unity gain buffer. The output of amplifier 241 is connected through a resistor 242 to the inverting input of an operational amplifier 243, the non-inverting input of which is connected to earth through a resistor 244. The signal on rail 198 which corresponds to the output of summing circuit 50 is connected through a resistor 247 to the inverting input of amplifier 243. The output of amplifier 243 is connected to its inverting input through a resistor 245 and a capacitor 246, connected in parallel. Thus, the amplifier 243 corresponds to both the summing circuit 52 and the frequency compensation circuit 53 shown in FIG. 1, the output of this amplifier corresponding to the output of frequency compensation circuit 53.

Figure 9:
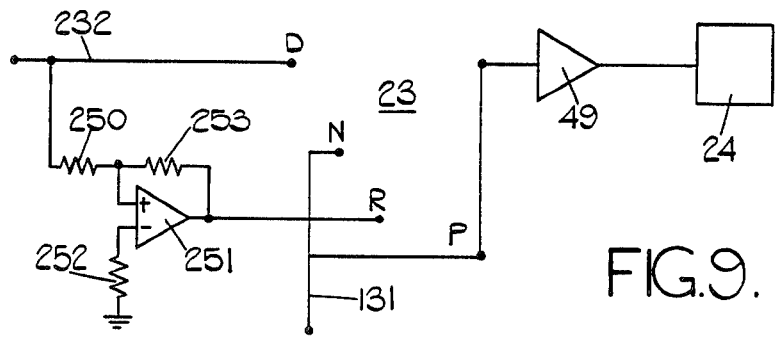

Referring now to FIG. 9, there is shown the detailed circuit diagram for the selector switch 23, inverter 48, power amplifier 49 and actuator 24. The signal on rail 131 which corresponds to the output of the frequency compensation circuit 36 shown in FIG. 1 is supplied to the N and R terminals of selector switch 23. The signal on rail 232 which corresponds to the output of the lowest wins circuit 47 is supplied to the D terminal of selector switch 23 and also through a resistor 250 to the inverting input of an operational amplifier 251. The non-inverting input of operational amplifier 251 is connected to earth through a resistor 252 and its output is connected to its inverting input through a resistor 253. Thus, the amplifier 251 and its associated components inverts the signal on rail 232 and corresponds to inverter 48. The output of amplifier 251 is connected to terminal R of the selector switch 23. As mentioned above, the output of selector switch 23 is connected through a power amplifier 49 to the actuator 24. The actuator 24 comprises a solenoid operated pressure control valve, and a main cylinder driven by the output of the pressure control valve. The piston of the main cylinder is connected to the reaction arm of the Perbury gearing 11.

The overall operation of the system will now be described with particular reference to FIG. 1.

The transmission system will first be considered with the selector switch 23 in the drive position D. With the selector switch in this position, when the pedal 22 is depressed, the signal generators 41 and 42 produce output signals corresponding to target throttle position and target engine speed. In normal operation, motor 20 will drive the throttle 19 into the target position and the actuator 24 will cause the ratio of the Perbury gearing 11 to vary so as to achieve the target engine speed.

When the target engine speed is low in comparison to the propeller shaft speed, there is a danger that the roller members of the Perbury gearing 11 could be driven beyond the position shown in FIG. 2d thereby causing wear to these members. In order to prevent this, the circuit 44 calculates the minimum safe engine speed for the prevailing value of the propeller shaft speed and, where this safe speed is greater than the target speed, the safe speed is selected by the highest wins circuit 43.

At low speeds of the propeller shaft 14, the Perbury gearing 11 loses the ability to control the engine speed because the torque demanded from the engine 10 becomes infinitesimally small. Under such circumstances, the error signal at the output of the summing circuit 45 becomes high and, in order to prevent a dangerously high torque being demanded by the reaction lever of the Perbury gearing 11, the lowest wins circuit 47 selects the output signal generated by the pedal 22. Thus, under these circumstances, the pedal 22 directly controls the output torque of a Perbury gearing 11. Also, at low speeds of the propeller shaft 14, in order to restrict the engine speed the output signal of the summing circuit 45 reduces the output signal of the summing circuit 50 thereby reducing the demanded position of the throttle below the target position of the throttle.

When the selector switch 23 is in the reverse position R, the operation is generally similar except that polarity of the output signal of amplifier 49 under torque demanded by the reaction lever of a Perbury gearing 11 is reversed.

When the selector switch is in position D with the vehicle stationary and the pedal 22 not depressed, the Perbury gearing 11 assumes the geared neutral position as shown in FIG. 2b and no torque is demanded by the reaction lever. In this condition, owing to imperfections in the system, such as stirring torques developed in the transmission lubricant, a low but not zero torque is transmitted to the propeller shaft 14. This torque is not sufficient to cause the vehicle to creep and the positive connection between the Perbury gearing 11 and the propeller shaft 14 through the split path gearing 12 ensures that the correct ratio for geared neutral is maintained. However, if the selector switch is now moved into the neutral position N or the parked position P, the brake 13 is released by means not shown and the positive connection between the Perbury gearing 11 and the propeller shaft 14 is broken. In this condition, in the absence of a control signal to the actuator 24, the low torques occurring in the transmission would cause the Perbury gearing to drift away from the ratio which corresponds to geared neutral. Consequently, when the brake 13 is re-engaged, a transient torque would be experienced in the transmission system. Also, with the selector switch 23 in the neutral position N or the park position P, if the vehicle begins to roll, for example down hill, there will be a miss-match between the ratio setting of the Perbury gearing 11 and the propeller shaft speed 14 which again could cause transient torque when the brake 13 is re-engaged. In order to prevent this miss-match of speeds and transient torques, a control signal is supplied to the actuator 24 in the neutral position N or parked position P as will now be described.

In the neutral position N or parked position P, the brake 13 is disengaged and the circuits 32, 33 and 34 estimate the propeller shaft speed $N_O'$ which corresponds to the present setting of the Perbury gearing 11. This speed $N_O'$ is compared with the actual speed $N_O$ in the summing circuit 35 and the difference between these two signals is supplied as an error signal through the frequency compensation circuitry 36 to the power amplifier 49. Consequently, where there is a miss-match between these two speeds, the actuator 24 drives reaction lever of the Perbury gearing 11 so as to equalise these speeds.

Although in the embodiment of the invention as described above, the gearing 11 takes the form of Perbury gearing and a split path gearing 12 takes the form of two epicyclic gear trains, it is envisaged that the invention is not restricted to this arrangement. For example, the continuously variable gearing 11 could take the form of a belt and sheave friction drive. Also, in place of the epicyclic gear train associated with the brake 13, there could be provided a conventional friction type clutch to disconnect the output shaft 74 from the rest of the split path gearing 12.

We claim:

1. A transmission system comprising a gear train (11,12) and means for controlling the gear train, said gear train comprising continuously variable gearing (11) having an input shaft (60), an output shaft (63) and an operating mechanism for controlling the gear ratio, and split path gearing (12) driven by the continuously variable gearing (11) having an output shaft and means (13) for disconnecting drive from the output shaft (74), said control means including an actuator (24) for driving the operating mechanism, characterized in that the control means further includes transducer means (25 to 28) mounted on the gear train, means (30 to 34, 37) responsive to the transducer means (25 to 28) for estimating the output shaft speed of the split path gearing (12) associated with a prevailing setting of the continuously variable gearing (11) when drive is disconnected from the output shaft (74), means (35) for comparing the estimated shaft speed with the actual output shaft speed, and means (36, 49) responsive to the comparing means (35) for providing a control signal to the actuator (24) so as to equalize the estimated shaft speed with the actual output shaft speed when drive is disconnected from the output shaft (14).

2. A transmission system as claimed in claim 1 characterised in that the transducer means comprises a first transducer (25) for measuring the speed of the input shaft of the continuously variable gearing (11), a second transducer (26) for measuring the speed of the output shaft of the continuously variable gearing (11), and a third transducer (27, 28) for measuring the speed of the output shaft of the split path gearing (12), said estimating (30 to 34, 37) estimating the output shaft speed of the split path gearing (12) associated with the prevailing setting of the continuously variable gearing (11) from the outputs of the first and second transducers.

3. A transmission system as claimed in claim 1 or claim 2 characterised in that the continuously variable gearing (11) comprises at least one pair of input and output discs (61, 62, 64), each input disc being mounted on the input shaft (60) of the continuously variable gearing (11) and each output disc bearing mounted on the output shaft (63) of the continuously variable gearing (11), each pair of discs being provided with a set of roller elements (65) mounted on angularly variable axes between complimentary toroidal surfaces formed on the discs, and the operating mechanism controlling the angular positions of the axes of the roller elements (65).

4. A transmission system as claimed in claim 1 or claim 2 characterised in that the split path gearing (12) includes an epicyclic gear arrangement, a first member (67) of which is connected to the input shaft of the continuously variable gearing (11), a second member (68, 69) of which is connected to the output shaft (63) of the continuously variable gearing (11), and a third member (70) of which is the output member of the epicyclic gear arrangement.

5. A transmission system as claimed in claim 4 characterised in that when the drive is disconnected from the output shaft (74) of the split path gearing (12) the estimating means estimates the output shaft speed $N_O$ in accordance with the following equation:

$$N_O = K_1 N_E - K_2 N_C$$

where $K_1$ and $K_2$ are constants, $N_E$ is the input shaft speed of the continuously variable gearing, and $N_C$ is the output shaft speed of the continuously variable gearing.

6. A method of controlling a transmission system comprising continuously variable gearing having an input shaft, an output shaft, and an operating mechanism for controlling the gear ratio, split path gearing driven by the continuously variable gearing having an output shaft and means for disconnecting drive from the output shaft, and an actuator for driving the operating mechanism, characterised in that the method includes, when drive is disconnected from the output shaft of the split path gearing, estimating the speed of the output shaft of the split path gearing associated with the prevailing setting of the continuously variable gearing, comparing the estimated output shaft speed with the actual output shaft speed, and providing a control signal to the actuator so as to equalise the estimated output shaft speed with the actual output shaft speed.

7. A method as claimed in claim 6 characterised in that, when drive is disconnected from the output of the split path gearing, the output shaft speed of split path gearing is estimated from the input and output shaft speeds of the continuously variable gearing.

8. A method as claimed in claim 7 characterised in that the output shaft speed $N_O$ of the split path gearing is estimated in accordance with the following equation:

$$N_O = K_1 N_E - K_2 N_C$$

where $K_1$ and $K_2$ are contants, $N_E$ is the input shaft speed of the continuously variable gearing, and $N_C$ is the output shaft speed of the continuously variable gearing.

* * * * *